(12) United States Patent
Madden et al.

(10) Patent No.: US 6,278,800 B1
(45) Date of Patent: Aug. 21, 2001

(54) METHOD AND ASSOCIATED APPARATUS FOR TRANSFORMING OF COLOR-IMAGE SIGNALS FOR CONSISTENT SHADOW TO HIGHLIGHT CHARACTERISTICS

(75) Inventors: Thomas Ethan Madden, East Rochester; Brian E. Mittelstaedt, W. Henrietta; Edward Joseph Giorgianni, Rochester, all of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 08/148,765

(22) Filed: Nov. 4, 1993

(51) Int. Cl.[7] .................................................. G06K 9/00
(52) U.S. Cl. ................................... 382/167; 358/518
(58) Field of Search ........................... 382/54, 41, 17, 382/49, 254, 162, 167, 302; 395/131; 348/253, 450, 453, 612, 624, 679, 708; 358/504, 518, 519, 523, 521; 345/431, 501

(56) References Cited

U.S. PATENT DOCUMENTS

| | | | |
|---|---|---|---|
| 4,346,402 | 8/1982 | Pugsley | 358/80 |
| 4,941,039 | 7/1990 | E'Errico | 358/80 |
| 4,962,421 | * 10/1990 | Murai | 358/530 |
| 4,977,448 | 12/1990 | Murata et al. | 358/75 |
| 4,984,071 | 1/1991 | Yonezawa | 358/80 |
| 5,012,333 | 4/1991 | Lee et al. | 358/80 |
| 5,029,019 | 7/1991 | Yoshihara et al. | 358/447 |
| 5,062,058 | 10/1991 | Morikawa | 364/521 |
| 5,070,413 | 12/1991 | Sullivan et al. | 358/456 |
| 5,315,415 | * 5/1994 | Kawai et al. | 358/515 |
| 5,323,249 | * 6/1994 | Liang | 358/518 |
| 5,357,352 | * 10/1994 | Eschbach | 358/518 |
| 5,432,906 | * 7/1995 | Newman et al. | 395/162 |

* cited by examiner

*Primary Examiner*—Bhavesh Mehta
(74) *Attorney, Agent, or Firm*—David M. Woods

(57) ABSTRACT

The present invention is a method and associated apparatus for transforming the color-image signals of a color image reproduction system to an intermediary image metric, defined in terms of colorimetric properties not necessarily corresponding to the colorimetric properties associated with either the system's input or output device, such that nonlinear transformations of all the individual image-bearing signal components, each encoded in terms of the intermediary image metric, result in desirable shadow-to-highlight characteristics for all colored objects of interest.

9 Claims, 5 Drawing Sheets

METHOD AND ASSOCIATED APPARATUS FOR TRANSFORMING OF COLOR-IMAGE SIGNALS FOR CONSISTENT SHADOW TO HIGHLIGHT CHARACTERISTICS

TECHNICAL FIELD OF THE INVENTION

The present invention relates in general to color image reproduction systems and is particularly directed to a technique for applying nonlinear transformations to color-image signals in a preferred manner so as to result in desirable shadow-to-highlight reproduction for both neutral and colored objects.

BACKGROUND OF THE INVENTION

Color image reproduction systems known in the art, such as that shown in FIG. 1, permit images to be captured by certain image-receptive media and/or devices such as input device 11, possibly digitized and stored, or output on to one or more image-receptive media and/or devices such as output device 13. Color-image signals from input device 11 may be transformed by transform 14 from the input device's image metric (i.e. a color image signal metric defined in terms of the colorimetric properties of the associated image input device) to a color image metric defined in terms of the colorimetric properties of a particular output device such as output device 13. Typically transform 14 involves three-dimensional signal operations in matrix, three-dimensional look-up-table, or other forms. Output device 13 may form a reproduced image from the transformed color-image signals.

Those skilled in the art will recognize that it is often desirable for the color image reproduction system to create a reproduced neutral scale which differs from the neutral scale of the original image. FIG. 2 for example shows the nonlinear relationship between the original scene densities and the densities reproduced by a typical photographic reflection print system. It is well known in the photographic art that such nonlinearities are necessary to compensate for physical effects such as viewing environment flare light, dynamic range limitations of the output device, and limitations of the output medium, as well as to compensate for psychophysical effects such as lateral inhibition, local brightness adaptation, etc.

When the color image reproduction system's color-image signals correspond to red, green, and blue image-bearing signals, the desired reproduced versus original neutral scale relationship may be achieved by passing the individual red, green, and blue image signals through nonlinear transformations such as one-dimensional look-up-tables. Referring to FIG. 3a, these nonlinear transformations 14a may typically operate on color-image signals which are encoded in terms of the input device image metric. Those skilled in the art will recognize that an input device image metric may be defined in terms of the chromaticity coordinates for a set of primary colors such as the red, green, and blue primary set of FIG. 4. Those skilled in the art will also recognize that the effective responsivities for the input device should correspond to the color-matching functions associated with its image metric primaries. FIG. 5a, for example, shows the color-matching functions associated with the red, green, and blue primaries of FIG. 4. In practice, effective spectral responsivities, such as those of FIG. 5b, are achieved by appropriate combinations of the physical spectral sensitivities of the sensing elements of the input device and the signal processing of the device. The color-image signals produced by the input device for object colors having chromaticity coordinates within region 41 of FIG. 4 would correspond to positive signal values for each color signal. The color-image signals produced by the input device for object colors having chromaticity coordinates outside region 41 of FIG. 4 would include at least one negative color signal value.

Referring now to FIG. 3b, alternately, the nonlinear transformations 14a may typically operate on color-image signals which have been operated on by transform 14 and are encoded in terms of the output device image metric (FIG. 3b). Those skilled in the art will recognize that an output device image metric may be defined in terms of the chromaticity coordinates for the image-forming primaries for the device which, for example, may correspond to the red, green, and blue primary set of FIG. 6. Those skilled in the art will recognize that the output device's gamut of reproducible chromaticities would be limited to the region 61 of FIG. 6 for an output device having these image-forming primaries.

Pictorial images typically contain neutral objects and colored objects illuminated at a range of illumination levels, such as a series ranging from shadow light to highlight. FIG. 7a shows a CIE 1976 metric chroma C* versus CIE 1976 metric lightness L* diagram depicting such a series for a given neutral object 70 and a series for a given colored object 71. A color image reproduction system, such as the systems of FIGS. 3a and 3b, utilizing the nonlinear neutral relationship of FIG. 2 will render the original neutral series 70 of FIG. 7a as shown in 72 of FIG. 7b. Because the nonlinear neutral relationship is achieved in either of these color image reproduction systems by applying nonlinear transformations 14a to the individual red, green, and blue image-bearing signals, the reproduction of a shadow-to-highlight series for colored objects is also altered. This altered color reproduction can result in both desirable and undesirable effects. For example, the reproduction of the original colored object series 71 depicted in FIG. 7a may exhibit C* versus L* characteristics represented by the series 73, 74, or 75 of FIG. 7b.

In the series depicted by 73, as the series progresses toward the highlights (higher L* values), the reproduced chroma of the color decreases while its reproduced lightness increases. In the series depicted by 74, as the series progresses toward the highlights, the reproduced chroma and lightness of the color both increase to certain limits and remain at those limits. In the series depicted by 75, as the series progresses toward the highlights, the reproduced chroma of the color increases while its reproduced lightness also increases. While the effect depicted in series 73 produces visually-pleasing reproduced images, the effects depicted in series 74 and 75 produce undesirable effects in reproduced images.

Our research has shown that when the nonlinear neutral scale transformation is applied to color-image signals corresponding to the colorimetric properties of the selected input or output device, as is typically done in imaging systems known in the art, the reproduced shadow-to-highlight series for some colored objects will correspond to the characteristic depicted in series 73 while for other colored objects, the reproduced shadow-to-highlight series will correspond to the undesirable characteristics depicted in series 74 or 75.

Our research has further shown that:
1) when the nonlinear transformations are applied to color-image signals which are encoded in terms of the input or output device image metric, and the color-image signals describe an object color within the chromaticity gamut defined by the colorimetric properties associated with the input or output device, the modified color-image signals representing a shadow-to-highlight series for that object color will correspond to the desirable characteristic depicted in series 73;

2) when the nonlinear transformations are applied to color-image signals which are in terms of the input or output device image metric, and the color-image signals describe an object color approximately coincident with the chromaticity gamut defined by the colorimetric properties associated with the input or output device, the modified color-image signals representing a shadow-to-highlight series for that object color will correspond to the undesirable characteristic depicted in series 74; and 3) when the nonlinear transformations are applied to color-image signals which are in terms of the input or output device image metric, and the color-image signals describe an object color beyond the chromaticity gamut defined by the colorimetric properties associated with the input or output device, the modified color-image signals representing a shadow-to-highlight series for that object color will correspond to the undesirable characteristic depicted in series 75.

Because practical imaging output devices and media have limited chromaticity gamuts and because nonlinear neutral scale transformations are typically applied to positive-valued color-image signals defined in terms of the colorimetric properties associated with the particular input or output device, the undesirable shadow-to-highlight series effects of 74 and 75 will occur for some object colors. These undesirable effects are particularly noticeable when the chromaticity gamut associated with the colorimetric properties of the actual output device/medium is larger than the chromaticity gamut associated with the positive-valued color-image signals of the color image metric in which the nonlinear transformations are applied.

SUMMARY OF THE INVENTION

The present invention is a method and associated apparatus for transforming the color-image signals of a color image reproduction system to an intermediary image metric, defined in terms of colorimetric properties not necessarily corresponding to the colorimetric properties associated with either the input or output device, such that application of nonlinear neutral scale transformations, achieved by nonlinear transformation of individual image-bearing signal components, each encoded in terms of the intermediary image metric, results in desirable shadow-to-highlight characteristics for all colored objects of interest.

More specifically the invention is a method for transforming color-image signals corresponding to a first set of color primaries to color-image signals corresponding to a second set of color primaries comprising the steps of:

a. transforming the color-image signals corresponding to the first set of color primaries to form intermediary color-image signals corresponding to a third set of color primaries;

b. applying a transform to said intermediary color-image signals to form modified intermediary color-image signals; and c. transforming said modified intermediary color-image signals to form color-image signals corresponding to said second set of color primaries.

In view of the foregoing discussion it can be seen that a primary object of the present invention is to provide an improved color image reproduction system.

A further object of the present invention is to provide an improved color image reproduction system including nonlinear transformations for producing desirable reproduction of shadow-to-highlight characteristics for neutral objects.

A further object of the present invention is to provide an improved color image reproduction system including nonlinear transformations for producing desirable reproduction of shadow-to-highlight characteristics for colored objects.

BRIEF DESCRIPTION OF THE DRAWINGS

The invention will be described with reference to the accompanying drawings, wherein.

DETAILED DESCRIPTION OF THE INVENTION

Figure 1:
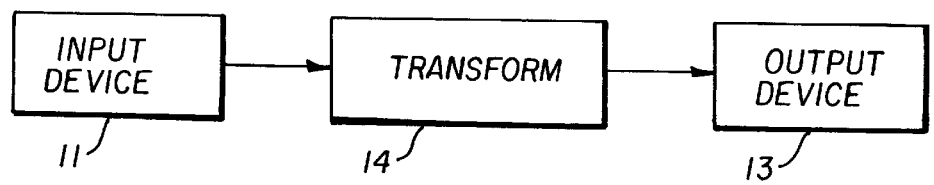
FIG. 1 is a diagrammatic illustration of a color image reproduction system.
Figure 2:
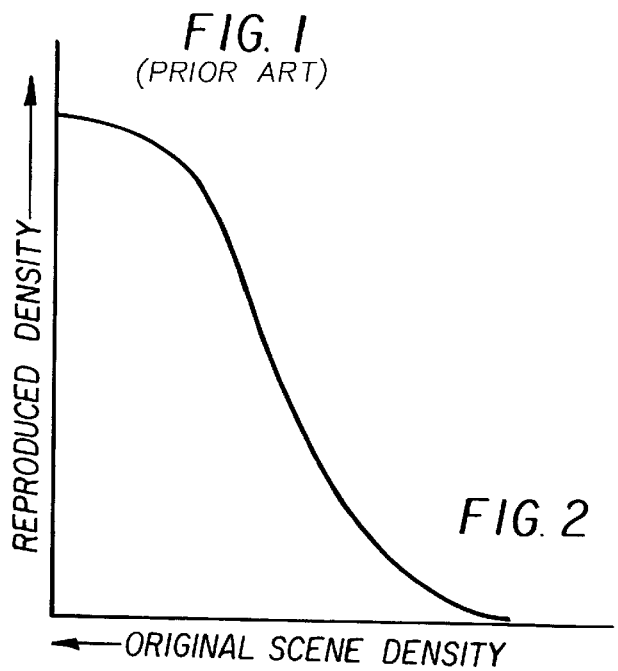
FIG. 2 is a reproduced density versus original density diagram.
Figure 3A:
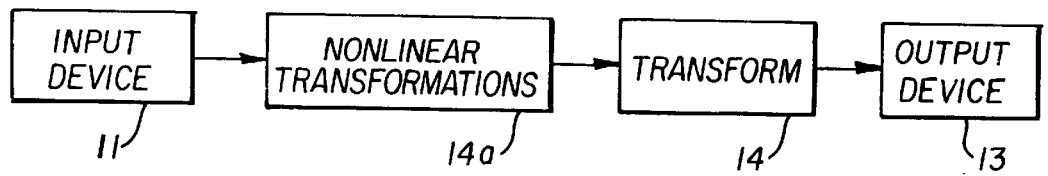
FIG. 3a is a diagrammatic illustration of a color image reproduction system.
Figure 3B:
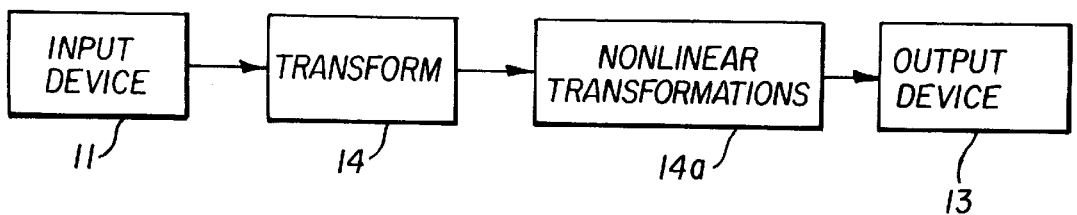
FIG. 3b is a diagrammatic illustration of a color image reproduction system.
Figure 3C:
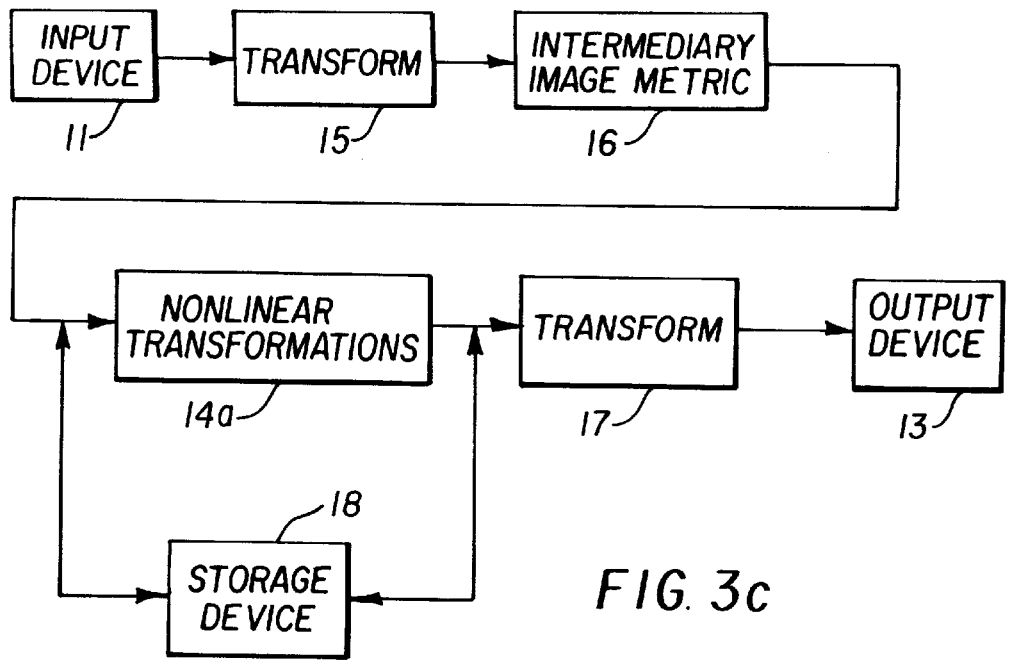
FIG. 3c is a diagrammatic illustration of a color image reproduction system in accordance with a preferred embodiment of the present invention.
Figure 4:
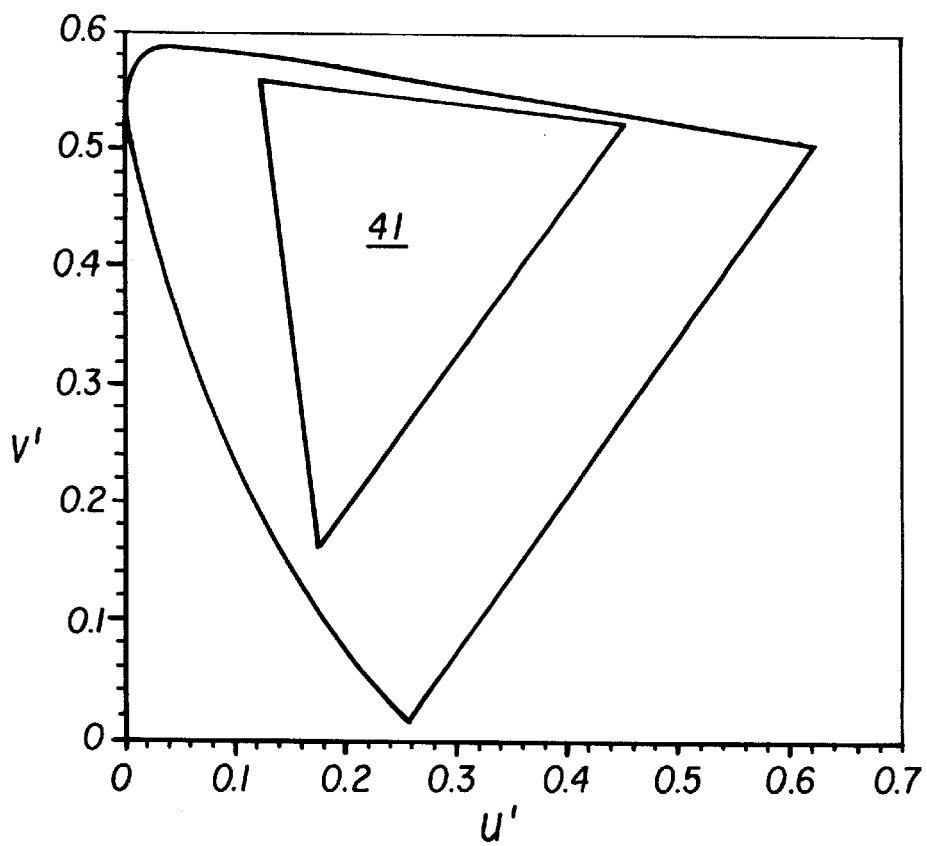
FIG. 4 is a 1976 CIE uniform-chromaticity-scale u', v' diagram.
Figure 5A:
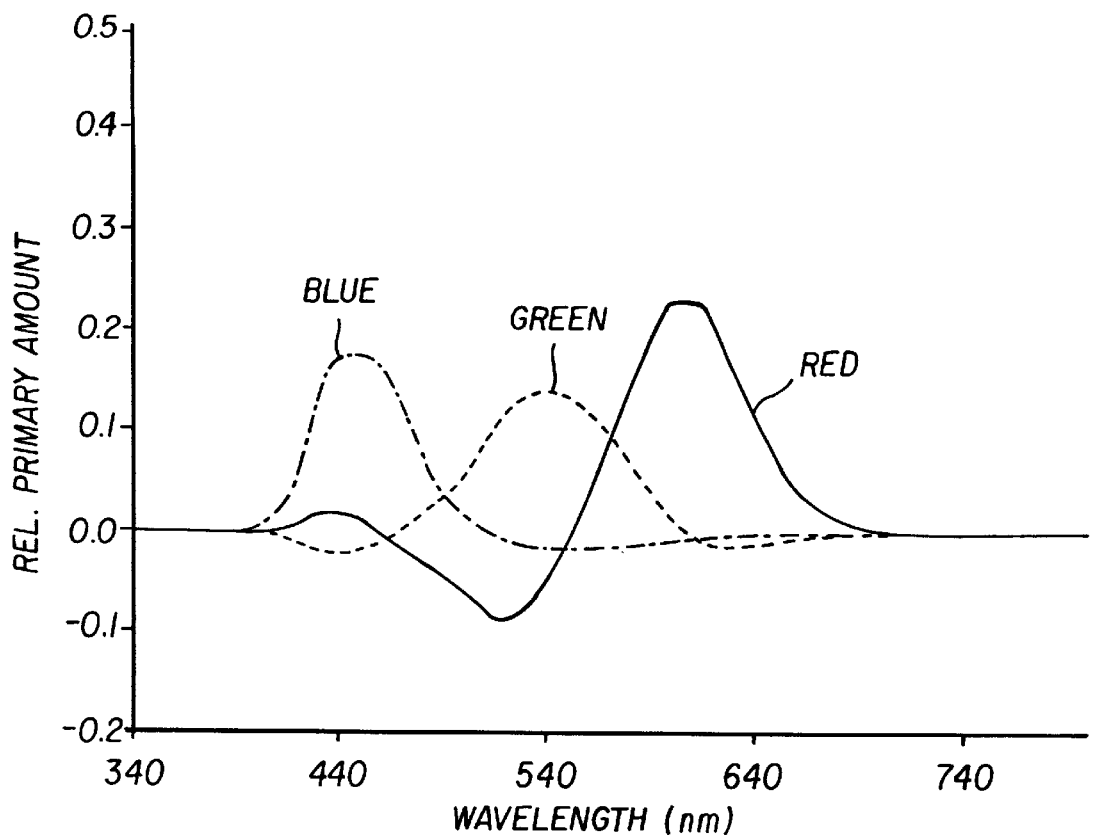
FIG. 5a depicts a set of color-matching functions.
Figure 5B:
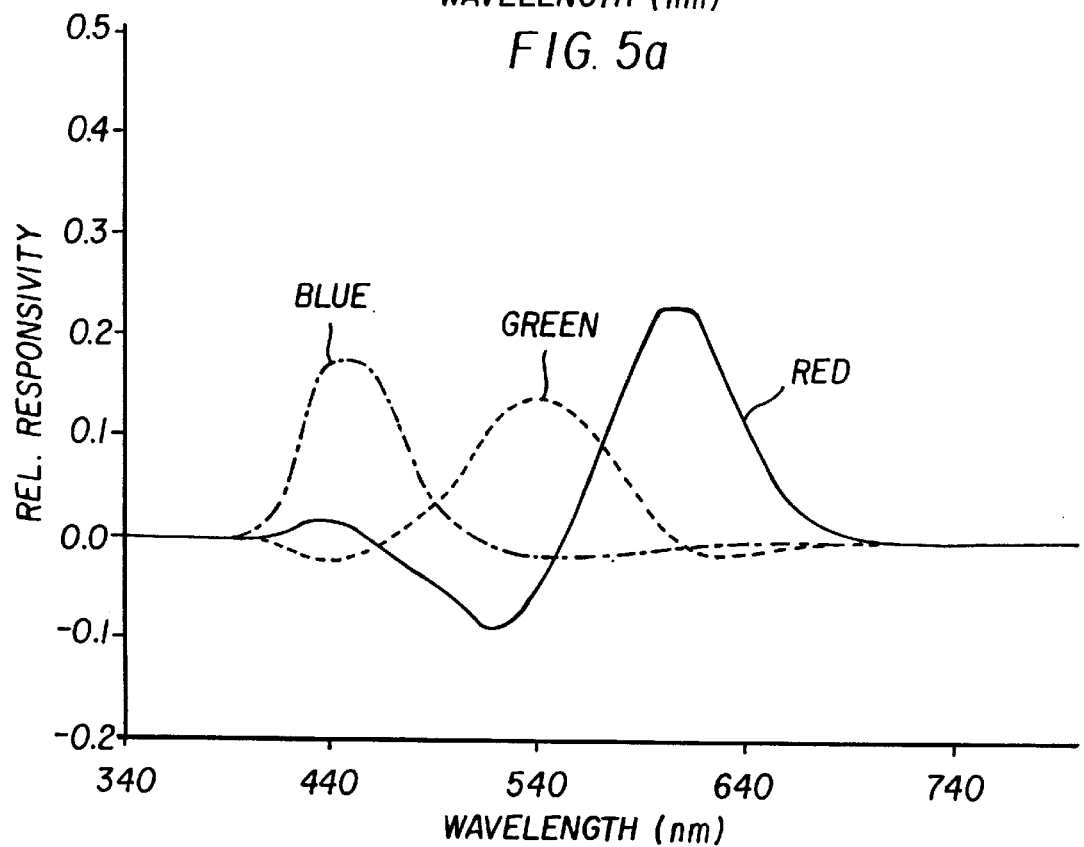
FIG. 5b. depicts a set of effective spectral responsivities.
Figure 8:
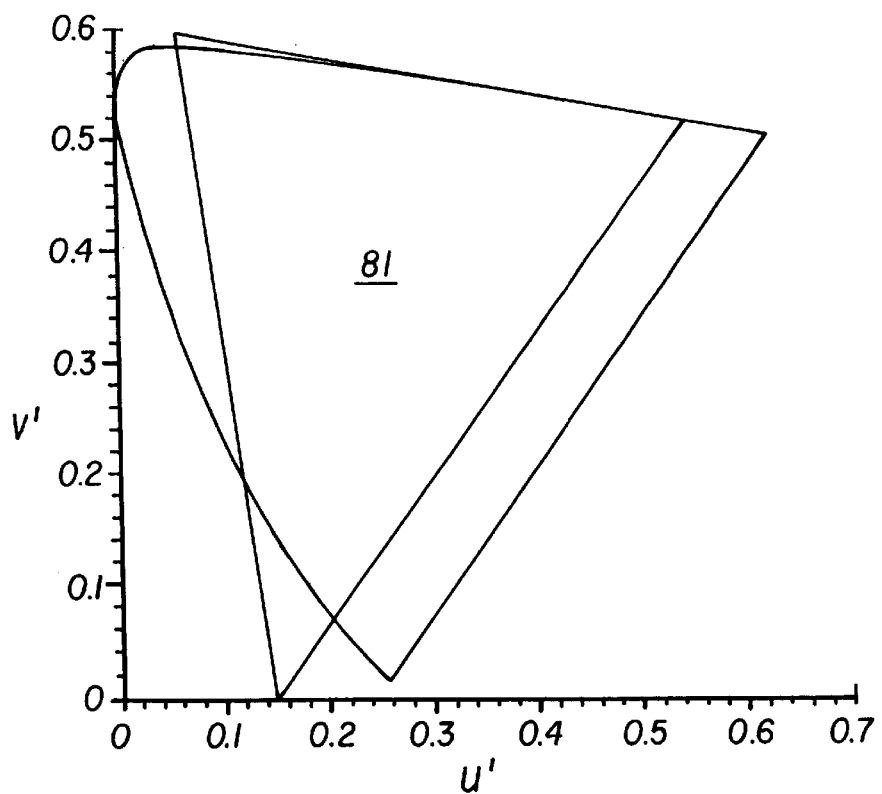
FIG. 8 is a 1976 CIE uniform-chromaticity-scale u', v' diagram.

FIG. 3c depicts a preferred embodiment of an improved color image reproduction system. Input device 11 provides color-image signals defined in terms of its colorimetric properties. The color-image signals produced by the input device for object colors having chromaticity coordinates within region 41 of FIG. 4 would correspond to all-positive signal values. The color-image signals produced by the input device for object colors having chromaticity coordinates outside region 41 of FIG. 4 would include at least one negative color image signal value. The positive and negative-valued color-image signals are transformed by three-dimensional operations included in transform 15 to an intermediary image metric 16 whose colorimetric properties are unassociated with the colorimetric properties of input device 11 or with the colorimetric properties of output device 13. The colorimetric properties of the intermediary image metric include the chromaticity gamut represented by 81 of FIG. 8 which is significantly larger than the chromaticity gamut associated with the all-positive signal values of input device 11 represented by 41 of FIG. 4.

The objects of the present invention are achieved by transforming intermediary metric color-image signals by nonlinear transforms 14a so as to create a desired reproduced neutral scale by passing the individual image-bearing signal components through nonlinear transformations (e.g., one-dimensional look-up-tables). Intermediary color-image signals may be stored at various stages of the signal processing sequence using a storage writing device 18 and recording media such as magnetic tape or disk, or optical disk. The color-image signals are further transformed by transform 17 to an image metric corresponding to the colorimetric properties of output device 13. Output device 13 forms a reproduced image from the modified color-image signals. Transforms similar to transform 17 may be used to provide modified color-image signals for output devices other than output devise 13.

Figure 7A:
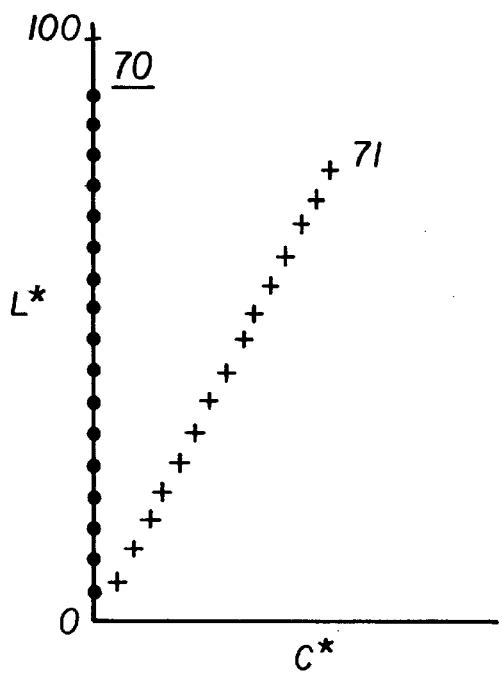
FIGS. 7a, 7b, and 7c are CIE 1976 metric chroma C* versus CIE 1976 metric lightness L* diagrams.
Figure 7B:
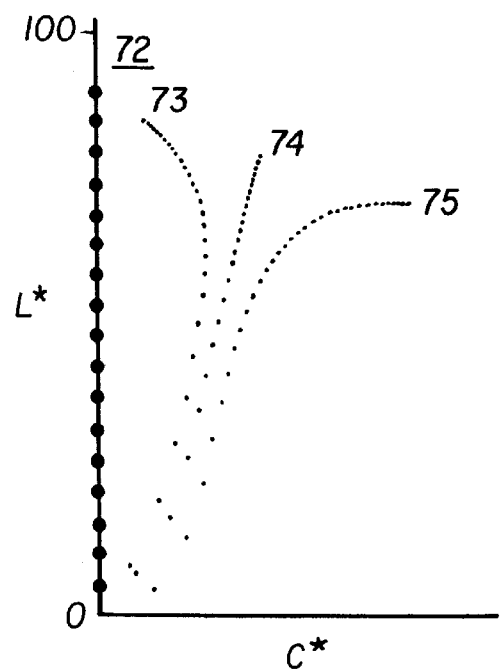
Figure 7C:
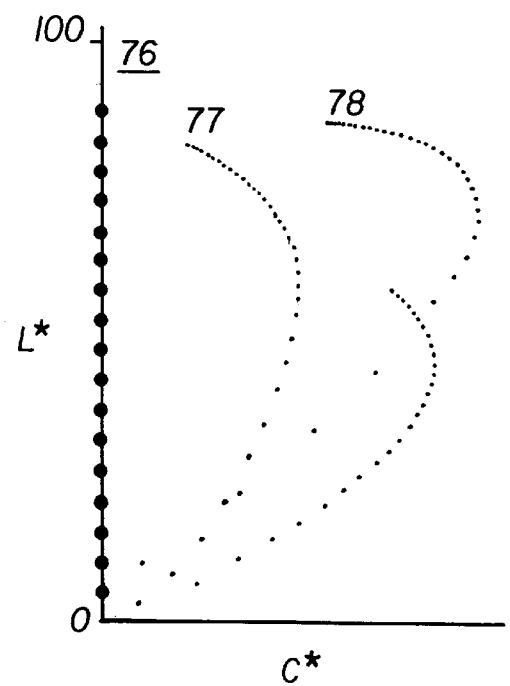
Figure 6:
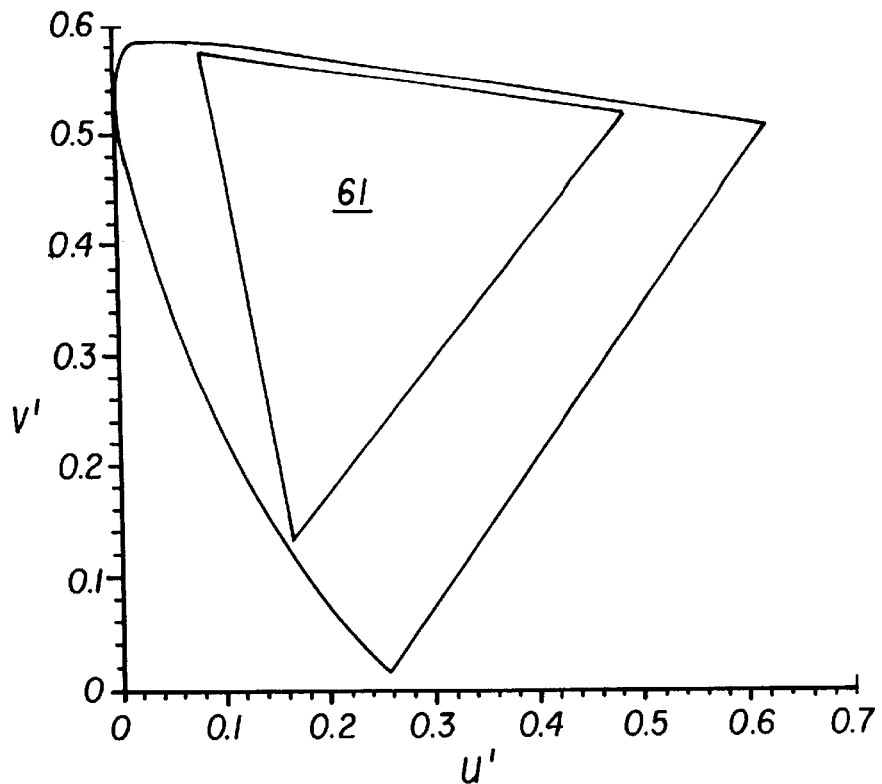
FIG. 6 is a 1976 CIE uniform-chromaticity-scale u', v' diagram.

Comparison of FIGS. 7b and 7c demonstrates the improvements resulting from the application of this preferred embodiment. FIG. 7b illustrates the result of applying nonlinear neutral scale transformations to color-image signals defined in terms of the colorimetric properties associated with the color image reproduction system input device 11, as shown in FIG. 3a. FIG. 7c illustrates the result of applying nonlinear neutral scale transformations to image signals defined in terms of an intermediary image metric whose colorimetric properties are unassociated with the colorimetric properties of input device 11, as shown in FIG. 3c.

The improvements resulting from the application of this preferred embodiment can be summarized as follows:

1) Neutral scale shadow-to-highlight series 76 is identical to neutral scale shadow-to-highlight series 72, demonstrating that the desired neutral scale reproduction is achieved by both imaging systems;

2) Object color shadow-to-highlight series 73, representative of an object color within the chromaticity gamut defined by the colorimetric properties associated with the input or output device continues to exhibit a similar desirable reproduction in the shadow-to-highlight series 77;

3) The reproduction of object color shadow-to-highlight series 74, representative of an object color approximately coincident with the chromaticity gamut defined by the colorimetric properties associated with the input device 11 is significantly improved and exhibits the desirable reproduction of the shadow-to-highlight series 78; and 4) The reproduction of object color shadow-to-highlight series 75, representative of an object color beyond the chromaticity gamut defined by the colorimetric properties associated with the input device 11 is also significantly improved and exhibits the desirable reproduction of the shadow-to-highlight series 79.

In this preferred embodiment the primaries of the intermediary image metric are specified by the following CIE u', v' uniform chromaticity coordinates:

Primary 1: u'=0.5399, v'=0.5190

Primary 2: u'=0.0500, v'=0.5920

Primary 3: u'=0.1980, v'=0.0001

However, a plurality of intermediary image metrics may be defined by other sets of primaries in addition to the set specified in this preferred embodiment. The particular intermediary image metric selected for application of nonlinear transformation of individual component image-bearing signals will influence several color reproduction characteristics. The influence of the primaries of the intermediary image metrics in which nonlinear transformations are applied to individual component image-bearing signals can be generalized as follows:

1) shadow-to-highlight series encoding for object colors within the chromaticity gamut defined by all-positive amounts of the intermediary metric primaries will exhibit a desirable characteristic;

2) shadow-to-highlight series encoding for object colors approximately coincident with the chromaticity gamut defined by all-positive amounts of the intermediary metric primaries will exhibit an undesirable characteristic;

3) shadow-to-highlight series encoding for object colors outside the chromaticity gamut defined by all-positive amounts of the intermediary metric primaries will exhibit an undesirable characteristic;

4) the chromaticities associated with shadow-to-highlight series encoding for neutral colors (colors corresponding to equal amounts of the three primaries as normalized to a reference white) are unaffected by the choice of intermediary metric primaries;

5) the chromaticities associated with shadow-to-highlight series encoding for primary colors (colors corresponding to any one of the three primaries of the intermediary image metric) will remain constant throughout the series;

6) the chromaticities associated with shadow-to-highlight series encoding for secondary colors (colors corresponding to equal mixtures of any two of the three primaries of the intermediary image metric) will remain constant throughout the series; and 7) the chromaticities associated with shadow-to-highlight series encoding for other colors (colors corresponding to other mixtures of the three primaries of the intermediary image metric) will tend to vary throughout the series when non-linear transformations are applied to the color-image signals.

The selection of the specific intermediary metric must be based of the requirements for the particular color image reproduction system. It is most important to identify which colors require an optimum shadow-to-highlight reproduction and which colors require reproduced shadow-to-highlight series with minimal hue changes. These two criteria can be used to determine optimal chromaticities for the intermediary metric primaries for a specified application.

While we have shown and described a preferred embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art. For example, we have referred to creating a desired reproduced neutral scale by applying nonlinear transformations to the individual "red", "green", and "blue" image-bearing records, but is should be understood that component image-bearing records may correspond to other forms of trichromatic image data not necessarily correlated with the perceptions normally associated with the terms "red", "green", and "blue". As another example, the image output devices described may accept three-channel (e.g. red, green, and blue) or four-channel (e.g. cyan, magenta, yellow, and black) color-image signals, and the intermediary color image metric may be transformed to these and other output device color image metrics. As yet another example, we have described intermediary image metrics wherein the red, green, and blue image-bearing signals are defined in terms of the chromaticity coordinates for a set of additive primaries which are associated with a set of effective spectral responsivities corresponding to color-matching functions. In some imaging applications, it may well be appropriate to define the intermediary image-bearing signals not in terms of additive primaries with corresponding color-matching functions, but rather in terms of a set of spectral sensitivity functions which do not correspond to color-matching functions, such as those associated with a photographic or electronic imaging means. As yet another example, we have shown a transformation of input device image metric signals directly to the intermediary image metric and a transformation of the intermediary metric image signals directly to the image metric for the selected output device. In practice, the transformation to the intermediary image metric may by accomplished at other points in the image processing sequence, and the intermediary metric image data need not be transformed directly to the image metric for the selected output device.

Parts List

| | |
|---|---|
| 11 | Input device |
| 13 | Output device |
| 14 | Transform |
| 14a | Nonlinear transformation |
| 15 | Transform |
| 16 | Image metric |
| 17 | Transform |
| 41 | Region |
| 61 | Region |
| 70 | Neutral object shadow-to-highlight series |
| 71 | Colored object series |
| 72 | Neutral scale shadow-to-highlight series |
| 73 | Object color shadow-to-highlight series |
| 74 | Object color shadow-to-highlight series |
| 75 | object color shadow-to-highlight series |
| 76 | Neutral scale shadow-to-highlight series |
| 77 | Shadow-to-highlight series |
| 78 | Shadow-to-highlight series |
| 79 | Shadow-to-highlight series |
| 81 | Chromaticity gamut |

What is claimed is:

1. A method for transforming color-image signals corresponding to a first set of color primaries to color-image signals corresponding to a second set of color primaries, comprising the steps of:
   a. inputting a color image represented by color-image signals, using an input device, the color-image signals having first colorimetric properties including a chromaticity gamut;
   b. transforming all the color-image signals corresponding to the first set of color primaries to form intermediary color-image signals corresponding to a third set of color primaries and having second colorimetric properties different from said first colorimetric properties;
   c. applying a transform to each of said intermediary color-image signals to form modified intermediary color-image signals having consistent shadow-to-highlight characteristics for colored objects within, coincident with and outside the chromatically gamut; and
   d. transforming all said modified intermediary color-image signals to form color-image signals corresponding to said second set of color primaries.

2. The method according to claim 1 wherein the transform of step c., is a nonlinear transform.

3. The method according to claim 1 wherein a plurality of transforms are applied in step c.

4. A storage system having included therein modified intermediary color-image signals formed by a method for transforming all color-image signals corresponding to a first set of color primaries to color-image signals corresponding to a second set of color primaries where all the color-image signals corresponding to said first set of color primaries are transformed to form intermediary color-image signals corresponding to a third set of color primaries and by applying a transform to each of said intermediary color-image signals to form said modified intermediary color-image signals.

5. Apparatus for transforming color-image signals corresponding to a first set of color primaries to color-image signals corresponding to a second set of color primaries, comprising:
   an input device and inputting a color image represented by color image signals having first colorimetric properties including a chromaticity gamut;
   means for transforming all the color-image signals corresponding to the first set of color primaries to intermediary color-image signals corresponding to a third set of color primaries and having second colorimetric properties different from said first colorimetric properties;
   means for applying a transform to each of said intermediary color-image signals to form modified intermediary color-image signals having consistent shadow-to-highlight characteristics for colored objects within, coincident with and outside the chromaticity gamut; and
   means for transforming all said modified intermediary color-image signals to form color-image signals corresponding to said second set of color primaries.

6. A method for transforming color-image signals corresponding to a first set of color primaries to color-image signals corresponding to a second set of color primaries, comprising the steps of:
   a. transforming all the color-image signals corresponding to the first set of color primaries to form intermediary color-image signals corresponding to a third set of color primaries and having first colorimetric properties different properties from second colorimetric properties of an output device;
   b. applying a transform to each of said intermediary color-image signals to form modified intermediary color-image signals having consistent shadow-to-highlight series for colored objects within, coincident with and outside a chromatically gamut;
   c. transforming all said modified intermediary color-image signals to form color-image signals corresponding to said second set of color primaries; and
   d. outputting said color image signals corresponding to said second set of color primaries using the output device having said second colorimetric properties including the chromaticity gamut.

7. Apparatus for transforming color-image signals corresponding to a first set of color primaries to color-image signals corresponding to a second set of color primaries, comprising:
   means for transforming all the color-image signals corresponding to the first set of color primaries to intermediary color-image signals corresponding to a third set of color primaries and having first colorimetric properties different from second colorimetric properties;
   means for applying a transform to each of said intermediary color-image signals to form modified intermediary color-image signals having consistent shadow-to-highlight characteristics for colored objects within, coincident with and outside a chromaticity gamut;
   means for transforming all said modified intermediary color-image signals to form color-image signals corresponding to said second set of color primaries; and an output device having the second colorimetric properties including the chromaticity gamut and outputting said color-image signals corresponding to said second set of color primaries.

8. A method for transforming color-image signals corresponding to a first set of color primaries to color-image signals corresponding to a second set of color primaries, comprising the steps of:

a. transforming all the color-image signals corresponding to the first set of color primaries to form intermediary color-image signals corresponding to a third set of color primaries;

b. applying a transform to each of said intermediary color-image signals to form modified intermediary color-image signals; and c. transforming all said modified intermediary color-image signals to form color-image signals corresponding to said second set of color primaries.

9. Apparatus for transforming color-image signals corresponding to a first set of color primaries to color-image signals corresponding to a second set of color primaries, comprising:

means for transforming all the color-image signals corresponding to the first set of color primaries to intermediary color-image signals corresponding to a third set of color primaries;

means for applying a transform to each of said intermediary color-image signals to form modified intermediary color-image signals; and means for transforming all said modified intermediary color-image signals to form color-image signals corresponding to said second set of color primaries.

* * * * *